United States Patent
Uchida

(10) Patent No.: US 10,379,286 B2
(45) Date of Patent: Aug. 13, 2019

(54) LIGHT GUIDE PLATE, LIGHT SOURCE DEVICE AND DISPLAY APPARATUS

(71) Applicant: Sakai Display Products Corporation, Sakai-shi, Osaka (JP)

(72) Inventor: Takashi Uchida, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 0 days.

(21) Appl. No.: 14/773,967

(22) PCT Filed: Feb. 18, 2014

(86) PCT No.: PCT/JP2014/053712
§ 371 (c)(1),
(2) Date: Sep. 9, 2015

(87) PCT Pub. No.: WO2014/141822
PCT Pub. Date: Sep. 18, 2014

(65) Prior Publication Data
US 2016/0018590 A1    Jan. 21, 2016

(30) Foreign Application Priority Data

Mar. 12, 2013 (JP) ................................. 2013-049671

(51) Int. Cl.
*F21V 8/00* (2006.01)
*G02F 1/1335* (2006.01)
*G02F 1/1333* (2006.01)

(52) U.S. Cl.
CPC .......... *G02B 6/0088* (2013.01); *G02B 6/002* (2013.01); *G02B 6/0046* (2013.01);
(Continued)

(58) Field of Classification Search
CPC .... G02B 6/0088; G02B 6/0046; G02B 6/002; G02B 6/0068; G02F 1/133615; G02F 2001/133322
(Continued)

(56) References Cited

U.S. PATENT DOCUMENTS

2012/0106196 A1* 5/2012 Cho ....................... G02B 6/002
362/609
2012/0194760 A1* 8/2012 Fukuda ............ G02F 1/133308
349/58

(Continued)

FOREIGN PATENT DOCUMENTS

| JP | 2002-100231 A | 4/2002 |
|----|---------------|--------|
| JP | 2012-084304 A | 4/2012 |
| JP | 2012-230243 A | 11/2012 |

*Primary Examiner* — Karabi Guharay
*Assistant Examiner* — Jessica M Apenteng
(74) *Attorney, Agent, or Firm* — Rudy J. Ng; Bret E. Field; Bozicevic, Field & Francis LLP

(57) ABSTRACT

Provided are a light guide plate which has a notch part formed at one edge part thereof and emits light made incident on the other edge part side from a light source through one surface thereof, such that it is possible to prevent the incident light from being irregularly reflected on the side face forming the notch part, and prevent an occurrence of stray light around the notch part, a light source device and a display apparatus. A side face forming the notch part has, on a light source side, an inclined face which is obliquely formed with respect to the incident light or a parallel face which is formed parallel to the incident light.

10 Claims, 5 Drawing Sheets

(52) U.S. Cl.
CPC ...... *G02B 6/0068* (2013.01); *G02F 1/133615* (2013.01); *G02F 2001/133322* (2013.01)

(58) Field of Classification Search
USPC .................................. 362/611, 612, 613, 609
See application file for complete search history.

(56) References Cited

U.S. PATENT DOCUMENTS

| | | | | |
|---|---|---|---|---|
| 2012/0201045 A1* | 8/2012 | Gotou | ................. | G02B 6/0038 362/602 |
| 2012/0307519 A1* | 12/2012 | Sakai | ................. | G02B 6/0016 362/602 |
| 2013/0265524 A1* | 10/2013 | Chang | ................. | G02B 6/0088 349/65 |

* cited by examiner

LIGHT GUIDE PLATE, LIGHT SOURCE DEVICE AND DISPLAY APPARATUS

This application is the national phase under 35 U.S.C. § 371 of PCT International Application No. PCT/JP2014/53712 which has an International filing date of Feb. 18, 2014 and designated the United States of America.

TECHNICAL FIELD

The present invention relates to a light guide plate which includes a notch part formed at one edge part thereof and emits light made incident on the other edge part side from a light source through one surface thereof, a light source device and a display apparatus.

DESCRIPTION OF RELATED ART

Recently, a display apparatus such as a liquid crystal television has been widely distributed. Such a display apparatus includes a light guide plate, and the light guide plate propagates a light from a light source inside thereof in a plane manner and irradiates the light toward a display panel which displays an image. Meanwhile, it is necessary to prevent a position shift of the light guide plate in order to properly irradiate the display panel with light, and generally, the position of the light guide plate is fixed by using a positioning part, and the light guide plate has a notch part formed at a position corresponding to the positioning part.

However, such a notch part is often formed in a U shape in a thickness direction of the light guide plate. Thereby, when fixing the position of the light guide plate by using the positioning part, the light propagating inside the light guide plate, for example, is reflected by a side face of the light guide plate corresponding to the positioning part, such that unintended reflected light is generated around the notch part and the reflected light is emitted to the display panel through the light guide plate. Thereby, unevenness in luminance occurs in the display panel.

That is, the notch part of the conventional light guide plate has the above-described U shape, such that the notch part has side face portions facing perpendicular to the light made incident from the light source and a side face portion bent in a small radius. Therefore, when the light is made incident on the side face portion, irregular reflection occurs at the side face portion of the notch part, and a part of the light emits to an outside through the side face portion to become so-called stray light. When the stray light is reflected by a reflection sheet to the display panel side, during displaying an image on the display panel, unevenness in luminance appears, and thereby provides an abnormal feeling to a user.

Further, the light guide plate is expanded and contracted due to a change in temperature, humidity and the like. Thus, at the time of such expansion and contraction, to prevent the locking between the positioning part and the notch part from being separated and prevent the position of the light guide plate from being shifted, it is necessary to sufficiently secure the range of notch parts.
This results in an increase in the side face forming the notch part, to further increase the unevenness in luminance in the image display on the display panel.

Furthermore, as compared with the case in which the light guide plate expands outward along the surface thereof, when the light guide plate is contracted inward, the side faces forming the notch part on which the incident light from the light source can be abutted is increased, and as a result, an occurrence of stray light on the side faces forming the notch part is increased.

Whereas, Japanese Patent Application Laid-open No. 2012-084304 discloses a light source module which includes, as a positioning part, positioning pins which secure the necessary strength for holding the light guide plate, and minimal notch parts provided corresponding to the positioning pins, thereby suppressing an occurrence of the luminance unevenness in the image display on the display panel.

SUMMARY

However, in such an above-described light source module of Japanese Patent Application Laid-open No. 2012-084304, as the size of the light source module becomes larger, the light guide plate becomes huge. And an amount of the expansion and contraction of the light guide plate is increased, for example, when the light guide plate is contracted at a low temperature, the locking between the notch part and the positioning pin is separated, so as to cause a problem that the light guide plate falls therefrom.

In consideration of the above-mentioned circumstances, it is an object of the present invention to provide a light guide plate which has a notch part formed at one edge part thereof and emits light made incident on the other edge part side from a light source through one surface thereof, and is configured to include a side face which forms the notch part, and has an inclined side face part which is formed on the light source side thereof obliquely with respect to the incident light, such that it is possible to prevent the incident light from being irregularly reflected on the side face forming the notch part, and prevent an occurrence of the above-described stray light around the notch part, a light source device and a display apparatus.

According to one aspect of the present invention, there is provided a light guide plate which includes a notch part formed at one edge part thereof and is configured to emit light made incident on the other edge part side from a light source through one surface thereof, including: a side face which forms the notch part, and has an inclined side face part which is formed on the light source side thereof obliquely with respect to the incident light.

According to the present invention, the side face which forms the notch part has an inclined side face part which is formed on the light source side thereof obliquely with respect to the incident light, such that it is possible to prevent the incident light from being irregularly reflected on the side face forming the notch part, and prevent an occurrence of stray light due to the light emitted to an outside through the side face forming the notch part.

In the light guide plate according to the present invention, the inclined side face part may be configured so as to have a larger incident angle of the light with respect to a direction perpendicular to the inclined side face part than a critical angle which generates total reflection.

According to the present invention, the inclined side face part is configured so as to have a larger incident angle of light with respect to a direction perpendicular to the inclined side face part than the critical angle which generates total reflection, such that the light made incident from the light source is totally reflected on the side face forming the notch part, without the occurrence of irregular reflection.

In the light guide plate according to the present invention, the light guide plate has a rectangular shape in which the other edge part is adjacent to the one edge part, a plurality of notch parts may be juxtaposed, and a side face which forms the nearest notch part to the light source in the juxtaposition direction may have a parallel side face part on the light source side parallel to the incident light.

According to the present invention, the side face which forms the nearest notch part to the light source in the juxtaposition direction has the parallel side face part on the light source side, such that it is possible to prevent an occurrence of stray light, without the occurrence of irregular reflection of the light made incident from the light source on the parallel side face part, and easily form the notch part.

According to another aspect of the present invention, there is provided a light source device including: the light guide plate according to any one of the above-described inventions; and the light source which emits light to be made incident on the light guide plate.

According to the present invention, the light made incident on the light guide plate from the light source is propagated in the light guide plate while being totally reflected without an occurrence of stray light as described above, thereby emitting uniform light from the one surface of the light guide plate.

According to another aspect of the present invention, there is provided a display apparatus including: the light source device according to the above-described invention; and a display panel which is provided on the one surface side of the light guide plate, and displays an image using light emitted from the light guide plate.

According to the present invention, the light made incident on the light guide plate from the light source device is propagated in the light guide plate while being totally reflected without an occurrence of stray light, such that the light is uniformly emitted from the one surface of the light guide plate, and the display panel displays an image using the light emitted from the light guide plate.

According to the present invention, the side face forming the notch part is configured to have, on the light source side, the inclined side face part which is obliquely formed with respect to the incident light or the parallel side face part which is formed parallel to the incident light, such that it is possible to prevent the incident light from being irregularly reflected on the side face forming the notch part, and prevent the occurrence of stray light around the notch part. Furthermore, when displaying an image using the light emitted from the one surface of the light guide plate, it is possible to prevent that an abnormal feeling is provided to a user due to unevenness in luminance.

The above and further objects and features will move fully be apparent from the following detailed description with accompanying drawings.

DETAILED DESCRIPTION

Hereinafter, a case in which a light guide plate, a light source device and a display apparatus according to embodiments of the present invention are applied to a so-called liquid crystal television including a liquid crystal display panel will be described in detail, by way of an example, with reference to the accompanying drawings.

Embodiment 1

Figure 1:
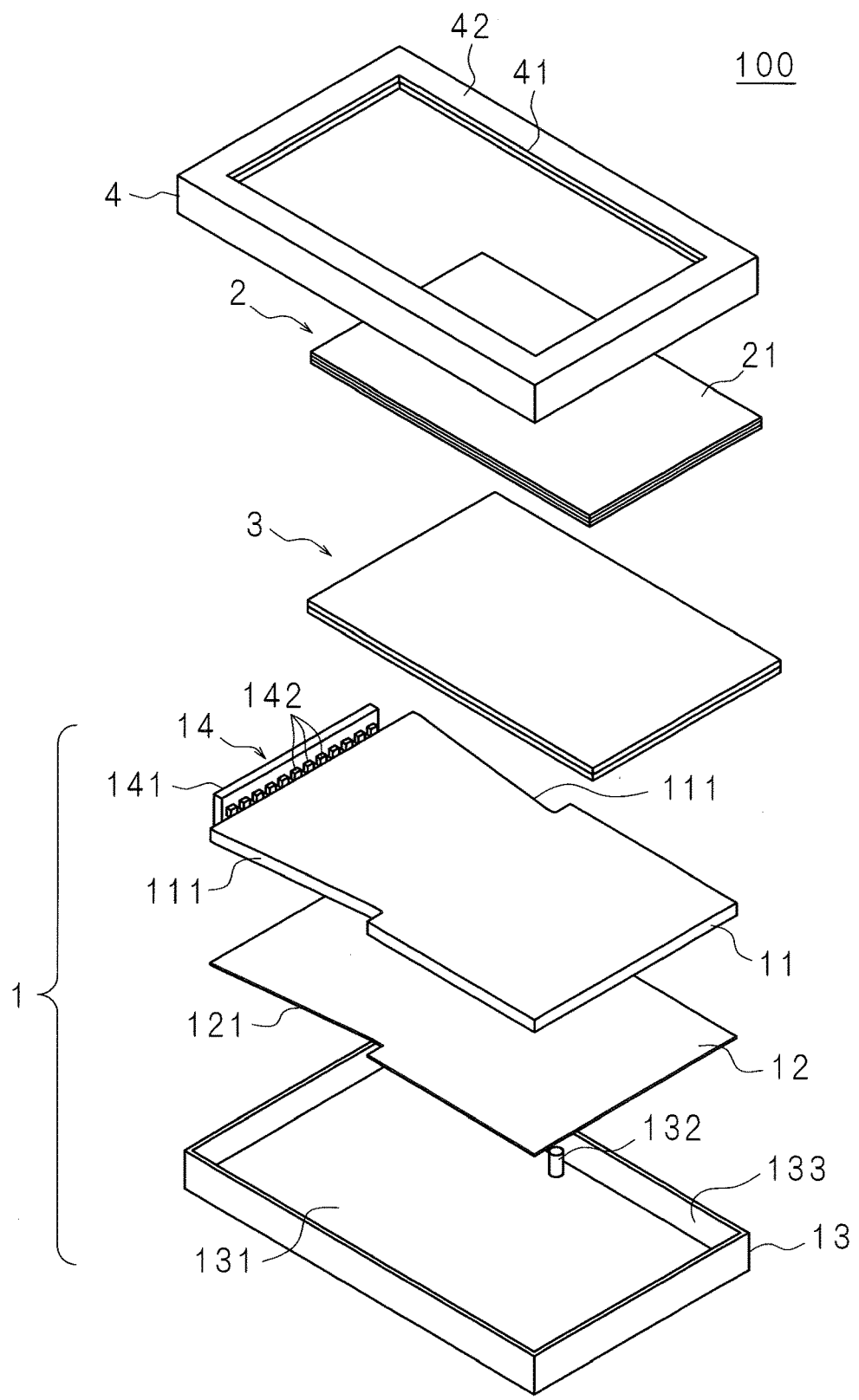
FIG. 1 is an exploded perspective view illustrating a configuration of main components of a liquid crystal television according to Embodiment 1 of the present invention.

FIG. 1 is an exploded perspective view illustrating a configuration of main components of a liquid crystal television according to Embodiment 1 of the present invention. FIG. 1 illustrates a liquid crystal television 100. As illustrated in FIG. 1, the liquid crystal television 100 includes a light source device 1, a liquid crystal display panel 2, an optical sheet 3, and a front cover 4 which house the liquid crystal display panel 2 and the optical sheet 3.

Further, the light source device 1 includes a light source unit 14, a light guide plate 11 which guides light made incident thereon from the light source unit 14 to one surface of the liquid crystal display panel 2 side, a reflection sheet 12 which reflects the light made incident thereon from the light source unit 14 toward the one surface of the light guide plate 11, and a back cover 13 which house the light source unit 14, the light guide plate 11, and the reflection sheet 12.

The front cover 4 is disposed on a front side from the liquid crystal display panel 2 on which an image is displayed. The front cover 4 is formed in a cylindrical shape having a rectangular bottom copying the shape of one surface 21 of the liquid crystal display panel 2 viewed from a user, and has a rectangular display window 41 opened in the bottom thereof. The user may view the image displayed on the one surface 21 of the liquid crystal display panel 2 through the display window 41.

Portions between edges of the bottom of the front cover 4 and edges of the display window 41 have a prescribed width. In other words, in the bottom of the front cover 4, residual portions other than the display window 41 are formed as hollow rectangular frame parts 42.

Peripheral edge parts of the one surface 21 of the liquid crystal display panel 2 are covered with the frame parts 42, and the optical sheet 3 is provided on the other surface side of the liquid crystal display panel 2, so that one surface of the optical sheet 3 is disposed to face the other surface of the liquid crystal display panel 2.

The liquid crystal display panel 2 is an active matrix type, for example, and includes a transparent substrate of the one surface 21 side and a transparent substrate of the other surface side, which are disposed to face each other at a prescribed gap. Liquid crystal is sealed in the gap between these transparent substrates. A polarizing plate (not illustrated) is provided between the transparent substrate of the other side and the optical sheet 3.

The light guide plate 11 of the light source device 1 is provided on the other surface side of the optical sheet 3, so that the one surface of the light guide plate 11 faces the other side of the optical sheet 3.

The optical sheet 3 is a publicly known sheet which functions to diffuse and collect, etc. light emitted from the light source unit 14 and made incident thereon through the light guide plate 11, so as to more uniformly emit the light toward the liquid crystal display panel 2. For example, the optical sheet 3 includes two diffusion sheets, and one prism sheet, wherein the prism sheet is installed between the two diffusion sheets.

One diffusion sheet of the two diffusion sheets, which is disposed on the light guide plate 11 side, is an optical sheet which functions to diffuse light made incident thereon from the light source unit 14 through the light guide plate 11 and allow it to be made incident on the prism sheet. In addition, the prism sheet is an optical sheet which functions to collect the light made incident thereon through the one diffusion sheet and emit it toward the other diffusion sheet. The light passing through the prism sheet is made incident on the other diffusion sheet perpendicular to the prism sheet.

The other diffusion sheet disposed on the liquid crystal display panel 2 side is an optical sheet which functions to again diffuse the light made incident thereon through the prism sheet and emit it toward the liquid crystal display panel 2 with a more uniform luminance distribution.

The light source device 1 is a so-called edge light type, and includes the light source unit 14, the light guide plate 11 disposed on the other side of the optical sheet 3, and the reflection sheet 12 provided on the other side light guide plate 11. The reflection sheet 12 is disposed so that one surface thereof faces the other surface of the light guide plate 11, and the light guide plate 11 and the reflection sheet 12 is housed in the back cover 13 with being laminated.

The light guide plate 11 is formed of a high transparency rectangular acrylic resin, for example, has a prescribed thickness, and guides the light emitted by light source unit 14 to the optical sheet 3 (liquid crystal display panel 2). For example, the light guide plate 11 may be configured in such a manner that one surface thereof facing the other surface of the optical sheet 3 has an emitting surface on which a pattern is formed so that the light made incident thereon from the light source unit 14 advances in the liquid crystal display panel 2 direction. Thereby, the light guide plate 11 may convert the light made incident thereon from the light source unit 14 into flat light to uniformly transmit it to the optical sheet 3 through the emitting surface. Further, the reflection sheet 12 may be provided on the other surface side of the light guide plate 11.

In addition, the light guide plate 11 has notch parts 111 and 111 formed on both edge parts of a long side thereof, corresponding to positioning parts 132 and 132 provided on the back cover 13 to be described below. For example, the notch parts 111 and 111 are formed at a center of each long side edge part of the light guide plate 11. Further, the notch parts 111 and 111 are formed in such a manner that recesses due to the notch parts 111 and 111 are formed in a substantially right-angled triangle in the thickness direction of the light guide plate 11.

Meanwhile, the reflection sheet 12 is formed in a rectangular shape having substantially the same dimensions as the light guide plate 11, and irregularly reflects the light made incident on the light guide plate 11 from the light source unit 14 at the other surface of the light guide plate 11 to emit it through the emitting surface of the light guide plate 11.

Also, similarly to the light guide plate 11, the reflection sheet 12 also has notch parts 121 and 121 formed on an edge part of each long side thereof, corresponding to the positioning parts 132 and 132 of the back cover 13. For example, the notch parts 121 and 121 have a shape copying the notch parts 111 and 111. That is, the recesses due to the notch parts 121 and 121 are formed in a substantially right-angled triangle in the thickness direction of the reflection sheet 12.

Further, the light guide plate 11 and the reflection sheet 12 are configured in such a manner that, during being housed in the back cover 13, the position between the notch parts 111 and 111 and the notch parts 121 and 121 match with each other in a direction in which these are laminated.

The light source unit 14 is provided around one side face of a short side of the light guide plate 11. The light source unit 14 has a substrate 141 disposed to face the one side face of the light guide plate 11, a plurality of light sources 142, 142, . . . , and 142 which are mounted on the substrate 141, and juxtaposed along the one side face of the light guide plate 11. The light source 142 may be, for example, a light emitting diode (LED), cold cathode fluorescent lamp (CCFL), hot cathode fluorescent lamp (HCFL), external electrode fluorescent lamp (EEFL) or the like.

The position of the light source unit 14 is not limited to near the one side face of the short side of the light guide plate 11, and may be provide near the other side face of the short side, or near the side face of the long side. Further, the light source unit 14 may be configured to be provided at a plurality of places, not only one place.

The back cover 13 is formed in a cylindrical shape having a rectangular bottom 131 copying the shape of the reflection sheet 12. The back cover 13 has positioning parts 132 and 132 formed at two places around both long side parts of the bottom 131 and side faces 133 thereof for positioning the light guide plate 11 and the reflection sheet 12 in the back cover 13 when they are housed therein.

As described above, in the edge light type light source device, the light source unit 14 is disposed near the one side face of the light guide plate 11, or around the one side face and the other side face which is a side opposite to the one side face, but a distance between the light guide plate 11 and the light source unit 14 is proportional to the amount of light made incident on the light guide plate 11. Therefore, in order to constantly maintain the luminance of the backlight (light source device 1), it is necessary to precisely determine the position of the light guide plate 11 with respect to the light source unit 14. For this, the positioning parts 132 and 132 are provided in the back cover.

Each positioning part 132 is formed in a cylindrical shape whose central axis is parallel to the thickness direction of the light guide plate 11, and protrudes around the center of both long sides of the bottom 131. In addition, the notch parts 111 and 111 of the light guide plate 11 and the notch parts 121 and 121 of the reflection sheet 12 are formed so as to correspond to the positioning parts 132 and 132 of the back cover 13. That is, the notch parts 111 and 111 of the light guide plate 11, and the notch parts 121 and 121 of the reflection sheet 12 are locked to the positioning parts 132 and 132, such that the position of the light guide plate 11 and the reflection sheet 12 with respect to the light source unit 14 is precisely determined.

In addition, the bottom 131 of the back cover 13 is configured so as to have a lower reflectivity than the reflection sheet 12. Moreover, the bottom 131 may have, for example, a black film which is applied thereon entirely or at least on portions corresponding to the recesses due to the notch parts 111 and 111 and the recesses due to the notch parts 121 and 121.

The light guide plate 11 and the reflection sheet 12 are housed in the back cover 13 in which the light guide plate 11 and the reflection sheet 12 are laminated in such a manner that the one surface of the reflection sheet 12 faces the other surface of the light guide plate 11, and the other surface of the reflection sheet 12 and the bottom 131 of the back cover 13 face each other. In this case, as described above, the position of the light guide plate 11 and the reflection sheet 12 during being housed in the back cover 13 are determined by the positioning parts 132 and 132. Further, in the direction in which the light guide plate 11 and the reflection sheet 12 are laminated, the bottom 131 of the back cover 13 is exposed through the notch part 121 of the reflection sheet 12 and the notch part 111 of the light guide plate 11.

Figure 2:
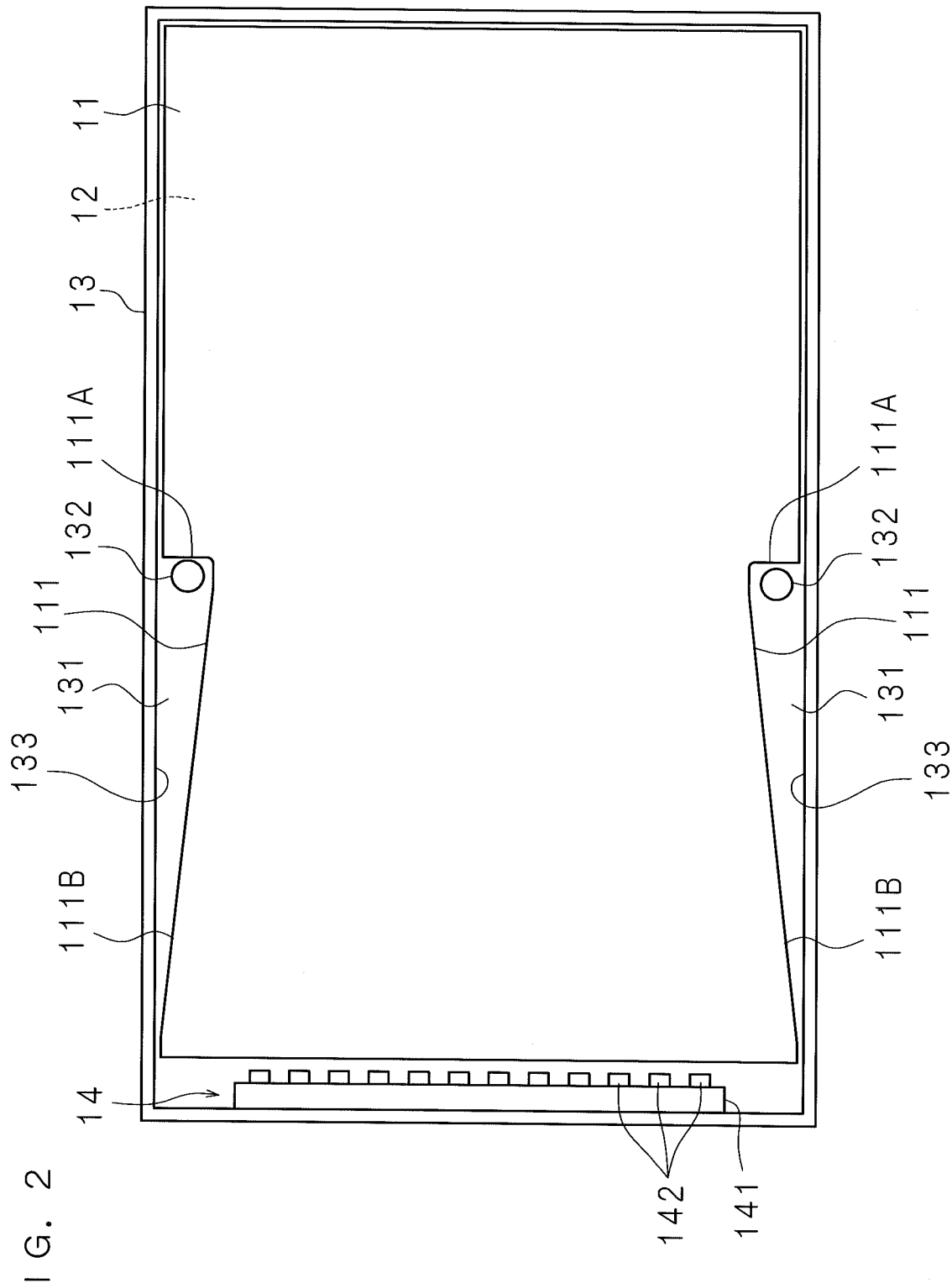
FIG. 2 is a schematic diagram illustrating a positional relationship between a light guide plate, a positioning part and a light source unit in the liquid crystal television according to Embodiment 1 of the present invention as seen in a thickness direction of the light guide plate.
Figure 3:
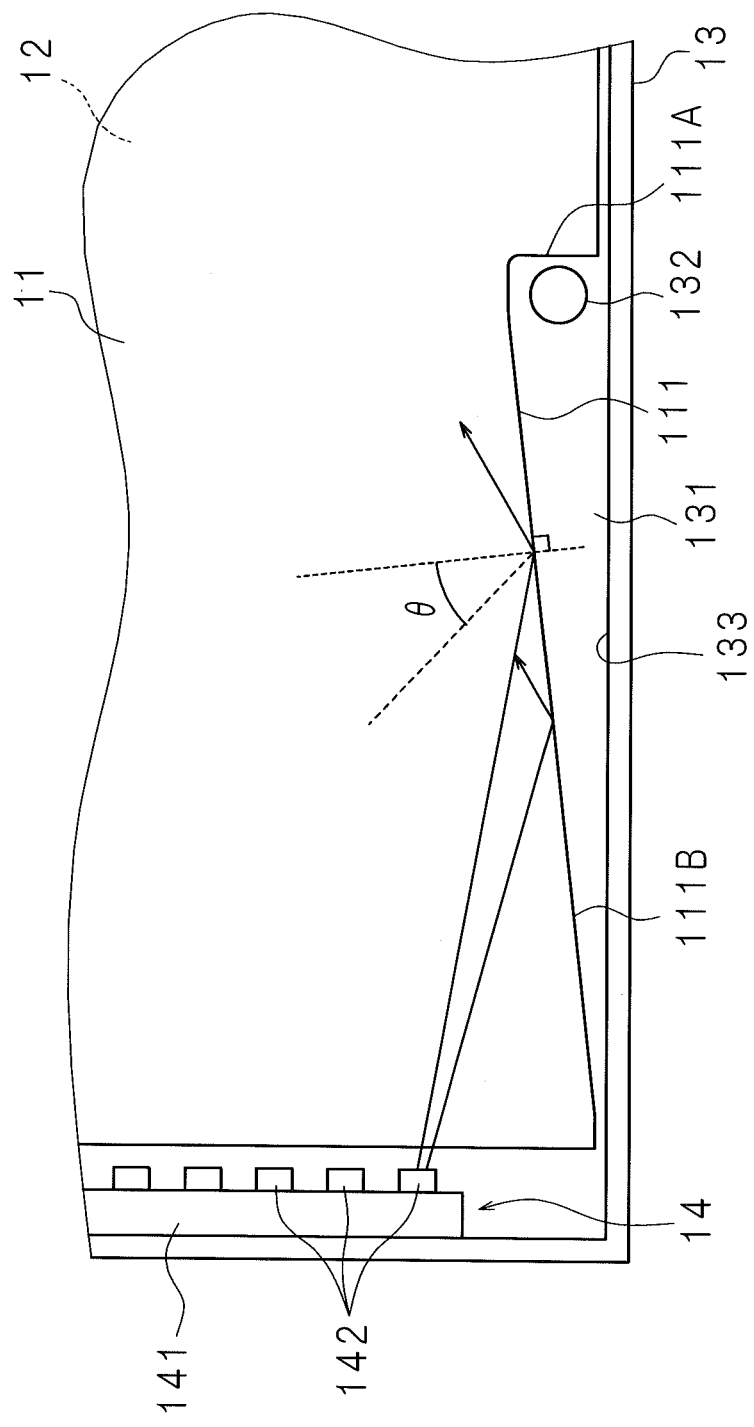
FIG. 3 is a partial enlarged view of a portion of FIG. 2.

FIG. 2 is a schematic view illustrating the positional relationship between the light guide plate 11, the positioning parts 132 and the light source unit 14 in the liquid crystal television 100 according to Embodiment 1 of the present invention as seen in the thickness direction of the light guide plate 11, and FIG. 3 is a partial enlarged view of a portion of FIG. 2.

The notch parts 111 and 111 include perpendicular faces 111A which are formed perpendicular to the side faces 133 of the back cover 13, and inclined faces 111B (inclined side face parts) which connect to the perpendicular faces 111A to be provided on the light source unit 14 side, and are formed obliquely with respect to the light source unit 14. Herein, as described above, the notch parts 111 and 111 are formed so that the recesses formed by the notch parts 111 and 111 have a substantially right-angled triangle shape in the thickness direction of the light guide plate 11.

In more detail, the notch parts 111 and 111 are formed in such a manner that the side face 133 of the back cover 13 and the perpendicular face 111A correspond to both sides holding the right angle of the right-angled triangle relating to the recess, and the inclined face 111B corresponds to the inclined side which is an opposite side of this right angle. In addition, the notch parts 111 and 111 are formed in such a manner that the gap between the side faces 133 of the back cover 13 and the inclined faces 111B is decreased toward the light source unit 14. In other words, the inclined faces 111B of the notch parts 111 and 111 are formed so as to face obliquely with respect to the incident light from the light source unit 14. Further, the perpendicular faces 111A and the inclined faces 111B are formed perpendicular to the surface of the light guide plate 11.

When the light guide plate 11 is housed in the back cover 13, the positioning parts 132 are located around the perpendicular face 111A of the notch part 111 and the side face 133.

Since the liquid crystal television 100 according to Embodiment 1 of the present invention has the above configuration, as described above, it is possible to solve the problem in which the stray light occurs around the notch part 111 and the problem in which luminance unevenness appears in the image display of the liquid crystal display panel 2 due to the stray light, which will be described in detail below.

The light from the light sources 142, 142, . . . , and 142 is made incident on the light guide plate 11, and then is propagated in the light guide plate 11 while being internally reflected, such that substantially uniform light is emitted toward the liquid crystal display panel 2 through the one surface of the light guide plate 11. However, when the incident light is propagated through inside of the light guide plate 11, if the light abuts the side faces forming the notch parts 111 and 111, total reflection or irregular reflection occurs on the basis of the incident angle of the incident light with respect to the side face.

In more detail, in order for the total reflection to occur, it is necessary for the incident angle formed by the direction perpendicular to the side faces forming the notch parts 111 and 111 and the incident light (incident direction) to be a so-called critical angle θ or more. Herein, for example, when light is incident from one medium (having refractive index n1) to the other medium (having refractive index n2), the critical angle θ may be represented as below.

$$\theta = \arc \times \sin\left(\frac{n2}{n1}\right).$$

For example, in the present embodiment, since the light guide plate 11 is made from an acrylic resin, in this case, the refractive index of the light guide plate 11 (acrylic resin) which is the one medium is "1.49," and the refractive index of air which is the other medium is "1," such that the critical angle θ is 42.2 degrees.

Meanwhile, when the incident angle formed by the direction perpendicular to the side faces forming the notch parts 111 and 111 and the incident light (incident direction) (hereinafter, simply referred to the incident angle) is the critical angle θ or less, for example, when the side faces forming the notch parts 111 and 111 are in such a state of being near perpendicular to the incident light, the incident light undergoes irregular reflection on the side faces. In this case, a part of the incident light is reflected inside of the light guide plate 11, and the other part of the incident light is emitted to the outside through the side faces forming the notch parts 111 and 111, to become so-called stray light. When such stray light is reflected by the reflection sheet 12 to the liquid crystal display panel 2 side, during displaying an image on the liquid crystal display panel 2, it appears as unevenness in luminance, and thereby provides an abnormal feeling to a user.

In general, the light guide plate is expanded and contracted due to a change in temperature, humidity and the like. Thus, at the time of such expansion and contraction, when the locking between the positioning part and the notch part is separated, a problem in which the position of the light guide plate is shifted occurs, such that it is necessary to sufficiently secure the range (for example, longitudinal and lateral dimensions) of the notch parts so as to prevent the position of the light guide plate from being shifted. However, such an expansion of the range of the notch part results in an increase in the side faces forming the notch parts, to further increase the above-described unevenness in luminance.

Compared with this, in the liquid crystal television 100 according to Embodiment 1 of the present invention, as described above, the inclined faces 111B, which are the side faces of the light guide plate 11 and portions of the light sources 142, 142, . . . , and 142 side of the side faces forming the notch parts 111 and 111, are formed so as to face obliquely to the incident light from the light sources 142, 142, . . . , and 142.

Therefore, in the liquid crystal television 100 according to Embodiment 1 of the present invention, even when the incident light from the light sources 142, 142, . . . , and 142 abuts the inclined face 111B which are the portions of the light sources 142, 142, . . . , and 142 side of the side faces forming the notch parts 111 and 111, the incident angle with respect to the direction perpendicular to the inclined faces 111B and 111B becomes larger than the critical angle, and thus the irregular reflection does not occur (see FIG. 3).

That is, when the incident light from the light sources 142, 142, . . . , and 142 abuts the inclined face 111B, the incident light is totally reflected by the inclined face 111B, and thereby the stray light due to the irregular reflection, for example, escaping of the light to the outside of the light guide plate 11 is also prevented.

Further, for some reason, even when a part of the incident light escapes to the outside of the light guide plate 11 through the side faces forming the notch parts 111 and 111, the escaped light is absorbed by the bottom 131 of the back cover 13 which is exposed through the notch part 121 of the reflection sheet 12 and the notch part 111 of the light guide plate 11.

As described above, in the liquid crystal television 100 according to the present invention, the inclined face 111B of the light sources 142, 142, . . . , and 142 side of the side faces forming the notch parts 111 and 111 is formed so as to obliquely face the incident light from the light sources 142, 142, . . . , and 142, and a side face having the incident angle smaller than the critical angle as well as a bent side having a small radius are not present on the light sources 142, 142, . . . , and 142 side. Accordingly, it is possible to prevent the occurrence of stray light, prevent the occurrence of unevenness in luminance due to the above-described reasons on the one surface 21 of the liquid crystal display panel 2, and prevent providing an abnormal feeling to the user, regardless of a wide or narrow range of the notch parts 111 and 111.

In the above description, the example in which the respective positioning part 132 protrude around the center of the both long sides of the bottom 131, in other words, the notch parts 111 and 111 are formed on the both edges of the long sides of the light guide plate 11 has been described, but the invention is not limited thereto. For example, the case in which three or more positioning parts 132 may be provided, and three or more notch parts 111 corresponding thereto may be employed.

Further, in the above description, the example in which the inclined face 111B is a flat surface has been described, but it is not limited thereto. The inclined face 111B may be configured to be a bent face so as to satisfy a condition that the incident angle in the face thereof is the critical angle θ or more.

Embodiment 2

Figure 4:
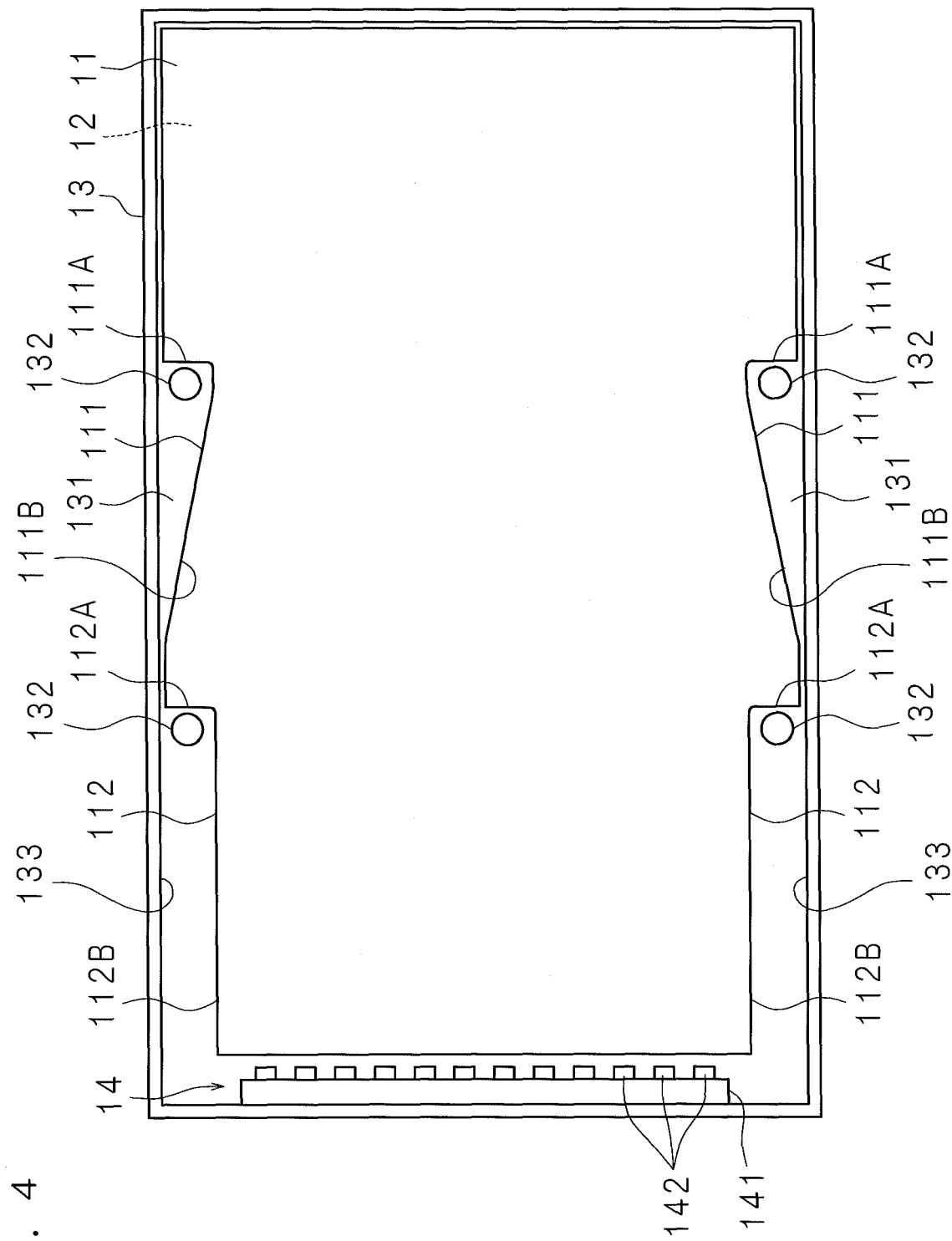
FIG. 4 is a schematic diagram illustrating a positional relationship between a light guide plate, a positioning part and a light source unit in the liquid crystal television according to Embodiment 2 of the present invention as seen in a thickness direction of the light guide plate.
Figure 5:
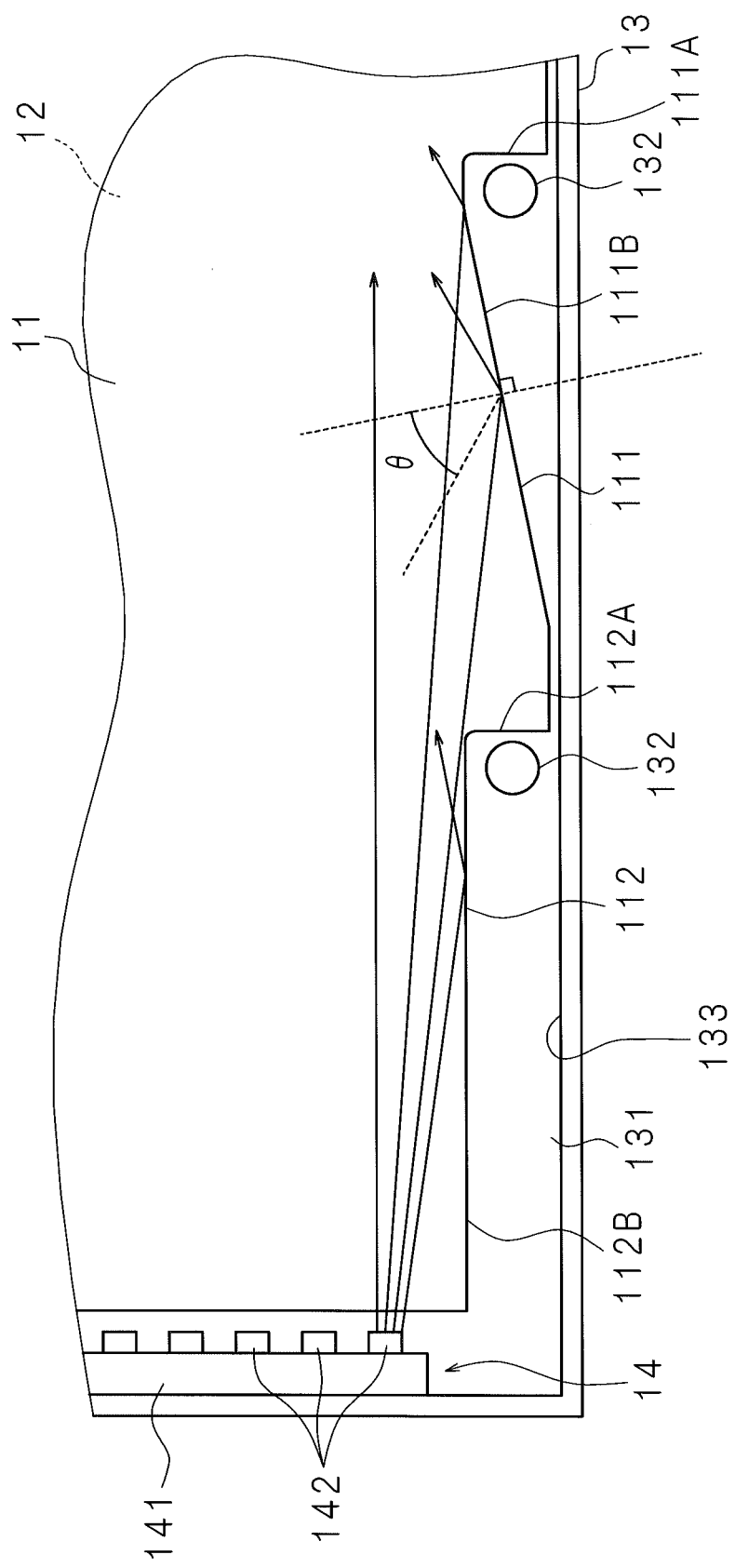
FIG. 5 is a partial enlarged view of a portion of FIG. 4.

FIG. 4 is a schematic view illustrating the positional relationship between a light guide plate 11, positioning parts 132 and the light source unit 14 in a liquid crystal television 100 according to Embodiment 2 of the present invention as seen in the thickness direction of the light guide plate 11, and FIG. 5 is a partial enlarged view of a portion of FIG. 4.

In the liquid crystal television 100 according to Embodiment 2 of the present invention, two positioning parts 132 and 132 protrude at a prescribed distance around the both long sides of the bottom 131 and the side faces 133 of the back cover 13.

In addition, the light guide plate 11 has notch parts 111 and notch parts 112 which are respectively formed on both edge parts of the long side thereof, corresponding to the positioning parts 132, 132, 132 and 132. That is, in the liquid crystal television 100 according to Embodiment 2 of the present invention, two notch parts 111 and two notch parts 112 are formed on the light guide plate 11. Of the notch parts 111 and the notch parts 112, the notch parts 112 are formed on the light source unit 14 side.

The notch parts 111 and 111 have, as similar to Embodiment 1, perpendicular faces 111A which are perpendicular to the side faces 133 of the back cover 13, and inclined faces 111B (inclined side face parts) which connect to the perpendicular faces 111A, and are formed obliquely with respect to the light source unit 14. Herein, the notch parts 111 and 111 are formed so that the recesses formed by the notch parts 111 and 111 have a substantially right-angled triangle shape in the thickness direction of the light guide plate 11. Further, the notch parts 111 and 111 are formed in such a manner that the inclined face 111B thereof are formed to face obliquely with respect to the incident light from the light source unit 14, so that the gap between the side faces 133 of the back cover 13 and the inclined face 111B is decreased toward the light source unit 14.

Also, the notch parts 112 and 112 are formed on the light source unit 14 side from the notch parts 111 and 111. The notch parts 112 and 112 include perpendicular faces 112A which are formed perpendicular to the side faces 133 of the back cover 13, and parallel faces 112B (parallel side face parts) which are connected to the perpendicular faces 112A to be provided on the light source unit 14 side, and formed so as to be parallel to the perpendicular direction with respect to the substrate 141 of the light source unit 14, in other words, to the incident light from the light sources 142, 142, . . . , and 142. That is, the notch parts 112 and 112 are formed so that the recesses formed by the notch parts 112 and 112 have a rectangular strip shape in the thickness direction of the light guide plate 11.

The notch parts 112 and 112 are formed in such a manner that the perpendicular faces 112A correspond to short side in the strip shape relating to the recesses, and the parallel faces 112B correspond to the long side in the strip shape, and are formed in such a manner that the gap between the side faces 133 of the back cover 13 and the parallel faces 112B is constant. Further, the perpendicular faces 112A and the parallel faces 112B are formed perpendicular to the surface of the light guide plate 11.

When the light guide plate 11 is housed in the back cover 13, the positioning parts 132 are located around the perpendicular faces 111A and the perpendicular faces 112A of the notch part 111.

Since the liquid crystal television 100 according to Embodiment 2 of the present invention has the above configuration, as described above, it is possible to solve the problem in which the stray light occurred around the notch parts 111 and the notch parts 112 appears in the image display of the liquid crystal display panel 2 as the unevenness in luminance, which will be described in detail below.

The light from the light sources 142, 142, . . . , and 142 is made incident on the light guide plate 11, and then is propagated in the light guide plate 11 while being internally reflected, such that substantially uniform light is emitted toward the liquid crystal display panel 2 through the one surface of the light guide plate 11. However, when the incident light is propagated inside of the light guide plate 11, if the light abuts the side faces forming the notch parts 111 or the notch parts 112, total reflection or irregular reflection occurs on the basis of the incident angle of the incident light with respect to the side face.

As described in Embodiment 1, the incident angle formed by the direction perpendicular to the side faces forming the notch parts 111 or the notch parts 112 and the incident light (incident direction) is the critical angle θ or more, the total reflection occurs.

Meanwhile, when the incident angle formed by the direction perpendicular to the side faces forming the notch parts 111 and the notch parts 112 and the incident light (incident direction) (hereinafter, simply referred to the incident angle) is the critical angle θ or less, the incident light undergoes irregular reflection on the side faces. In this case, a part of the incident light is reflected inside of the light guide plate 11, and the other part of the incident light is emitted to the outside through the side faces forming the notch parts 111 and the notch parts 112, to become the stray light. When such the stray light is reflected by the reflection sheet 12 to the liquid crystal display panel 2 side, during displaying an image on the liquid crystal display panel 2, it appears as unevenness in luminance, and thereby provides an abnormal feeling to the user.

In general, when the light guide plate is expanded and contracted, the locking between the positioning part and the notch part is separated, and the problem of shifting the position of the light guide plate occurs. To prepare the problem, it is necessary to sufficiently secure the range (for example, longitudinal and lateral dimensions) of notch parts, however, it results in an increase in the side faces forming the notch parts, to further increase the above-described unevenness in luminance.

Compared with this, in the liquid crystal television 100 according to Embodiment 2 of the present invention, as described above, the inclined faces 111B, which are the side faces of the light guide plate 11 and portions of the light sources 142, 142, . . . , and 142 side of the side faces forming the notch parts 111 and 111 and the notch parts 112 and 112, are formed so as to face obliquely to the incident light from the light sources 142, 142, . . . , and 142, and the parallel faces 112B are formed so as to be parallel to the incident light from the light sources 142, 142, . . . , and 142.

Therefore, in the liquid crystal television 100 according to Embodiment 2 of the present invention, when the incident light from the light sources 142, 142, . . . , and 142 abuts the inclined face 111B which are the portions of the light sources 142, 142, . . . , and 142 side of the side faces forming the notch parts 111 and 111, the incident angle with respect to the direction perpendicular to the inclined faces 111B becomes larger than the critical angle, and thus the irregular reflection does not occur (see FIG. 5).

In the liquid crystal television 100 according to Embodiment 2 of the present invention, abutting of the light from the light sources 142, 142, . . . , and 142 to the parallel faces 112B and 112B which are the portions of the light sources 142, 142, . . . , and 142 side of the side faces forming the notch parts 112 and 112 is decreased, and even when abutting, since the incident angle formed by the incident light becomes larger than the critical angle, irregular reflection does not occur (see FIG. 5).

That is, when the incident light from the light sources 142, 142, . . . , and 142 abuts the inclined face 111B or the parallel faces 112B, the incident light is totally reflected by the inclined face 111B and the parallel faces 112B, thereby escaping of the light to the outside of the light guide plate 11 and the stray light due to the irregular reflection are prevented.

As described above, in the liquid crystal television 100 according to the present invention, the inclined faces 111B and 111B of the light sources 142, 142, . . . , and 142 side of the side faces forming the notch parts 111 and 111 are formed so as to obliquely face the incident light from the light sources 142, 142, . . . , and 142, and the parallel faces 112B and 112B of the light sources 142, 142, . . . , and 142 side of the side faces forming the notch parts 112 and 112 are formed so as to be parallel to the incident light from the light sources 142, 142, . . . , and 142.

Therefore, in any one of the notch parts 111 and 111 and the notch parts 112 and 112, the side face having an incident angle smaller than the critical angle as well as a bent side having a small radius are not present on the light sources 142, 142, . . . , and 142 side. Accordingly, it is possible to prevent the occurrence of stray light, prevent the occurrence of unevenness in luminance due to the above-described reasons on the one surface 21 of the liquid crystal display panel 2, and prevent providing an abnormal feeling to the user, regardless of a wide or narrow range of the notch parts 111 and 111 and the notch parts 112 and 112.

In the above description, the example in which two positioning parts 132 protrude on the both long sides of the bottom 131 of the back cover 13, respectively, and corresponding thereto, the notch part 112 and the notch part 111 having the shapes different from each other are formed on both side parts of the long side of the light guide plate 11 in this order from the light source unit 14 has been described, but the invention is not limited thereto.

For example, it may be configured in such a manner that, when three or more positioning parts 132 protrude on the both long side parts of the bottom 131, respectively, corresponding thereto, the notch part 112, the notch part 111, and the notch parts 111, . . . are formed on the both long side parts of the light guide plate 11 in this order from the light source unit 14, respectively.

The same parts as those in Embodiment 1 will be denoted by the same reference numerals, and will not be described.

Further, the liquid crystal television 100 according to the present invention is not limited to the above description. For example, it may be configured in such a manner that the notch part 112, the notch part 111, and the notch parts 111, . . . are formed on one edge part of the both edge parts of the long side of the light guide plate 11 in this order from the light source unit 14, and the notch part 111, the notch part 111, and the notch parts 111, . . . are formed on the other edge part, similar to Embodiment 1.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A light guide plate which includes a major surface, a first side face, a second side face adjacent to the first side face, a third side face facing to the first side face, a fourth side face facing to the second side face, and a first notch part formed on the first side face, emits light entering from the second side face through the major surface, and has a rectangular shape in a plan view and a predetermined thickness, wherein:
   a face of the first notch part proximal to the second side face is an inclined side face which is formed obliquely with respect to the first side face,
   the inclined side face is configured such that an incident angle formed when the light entering from the second side face is directly made incident on the inclined side face is larger than a critical angle at which incident light is totally reflected by the inclined side face, and
   the light entering from the second side face and being totally reflected by the inclined side face progresses toward the third side face or the fourth side face.

2. The light guide plate according to claim 1, wherein a second notch part is formed on the first side face,
   the second notch part is closer than the first notch part to the second side face, and
   the second notch part includes a parallel side face parallel to the first side face.

3. The light guide plate according to claim 2, wherein the parallel side face extends from the second side face.

4. The light guide plate according to claim 3, wherein the second side face is shorter than the forth side face.

5. A light source device comprising:
the light guide plate according to claim 1; and
the light source which emits light to be entered into the light guide plate.

6. A display apparatus comprising:
the light source device according to claim 5; and
a display panel which is provided on a side of the major surface of the light guide plate, and displays an image using light emitted from the light guide plate.

7. The light source device according to claim 5, further comprising: a back cover which houses the light source and the light guide plate, wherein the back cover is provided with a positioning part which is locked to the first notch part such that a position of the light guide plate with respect to the light source is determined.

8. The light source device according to claim 7, wherein the first notch part is formed such that a gap between a side face of the back cover and the inclined side face decreases toward the light source.

9. The light guide plate according to claim 1, wherein the inclined side face is extended from a vicinity of a position where the first side face and the second side face intersect.

10. The light guide plate according to claim 1, wherein the inclined side face extends from an end part of the first side face, which is proximal to the second side face, to a middle part of the first side face.

* * * * *